(12) United States Patent
Goetting et al.

(10) Patent No.: US 10,658,962 B2
(45) Date of Patent: May 19, 2020

(54) METHOD, ANGLE DETERMINATION APPARATUS AND CONTROL APPARATUS

(71) Applicant: Robert Bosch GmbH, Stuttgart (DE)

(72) Inventors: Gunther Goetting, Stuttgart (DE); Lei Chen, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/075,271

(22) PCT Filed: Dec. 21, 2016

(86) PCT No.: PCT/EP2016/082137
§ 371 (c)(1),
(2) Date: Aug. 3, 2018

(87) PCT Pub. No.: WO2017/133824
PCT Pub. Date: Aug. 10, 2017

(65) Prior Publication Data
US 2019/0089282 A1 Mar. 21, 2019

(30) Foreign Application Priority Data
Feb. 5, 2016 (DE) .......... 10 2016 201 746

(51) Int. Cl.
*H02P 21/00* (2016.01)
*H02P 21/18* (2016.01)
(Continued)

(52) U.S. Cl.
CPC .............. *H02P 21/18* (2016.02); *H02P 6/183* (2013.01); *H02P 21/22* (2016.02); *H02P 21/26* (2016.02); *H02P 2203/11* (2013.01)

(58) Field of Classification Search
CPC ................. H02P 21/18; H02P 21/22
(Continued)

(56) References Cited

U.S. PATENT DOCUMENTS

2010/0156333 A1* 6/2010 Chen .............. B60L 50/16
318/400.33
2010/0156334 A1* 6/2010 Nishimura ........... B60L 15/025
318/400.33
(Continued)

FOREIGN PATENT DOCUMENTS

WO      2010000343      1/2010

OTHER PUBLICATIONS

International Search Report for Application No. PCT/EP2016/082137 dated Mar. 10, 2017 (English Translation, 3 pages).
(Continued)

*Primary Examiner* — Erick D Glass
(74) *Attorney, Agent, or Firm* — Michael Best & Friedrich LLP

(57) ABSTRACT

The present invention discloses a method for determining a rotor angle of a rotor of an electric machine, having the steps of producing a torque-dependent test signal which depends on the torque of the electric machine and has a higher frequency than a supply signal for the electric machine, controlling the electric machine using the supply signal and the test signal which is superimposed on the supply signal, recording phase currents of the electric machine, and determining the rotor angle of the rotor of the electric machine on the basis of the effects of the test signal on the phase currents. The present invention also discloses an angle determination apparatus and a corresponding control apparatus.

16 Claims, 4 Drawing Sheets

(51) Int. Cl.
*H02P 6/18* (2016.01)
*H02P 21/26* (2016.01)
*H02P 21/22* (2016.01)

(58) Field of Classification Search
USPC .................................................. 318/400.02
See application file for complete search history.

(56) References Cited

U.S. PATENT DOCUMENTS

| | | | | |
|---|---|---|---|---|
| 2011/0012544 A1* | 1/2011 | Schulz | ................. | B60L 15/025 |
| | | | | 318/400.02 |
| 2014/0145660 A1* | 5/2014 | Shimada | ................. | H02P 6/183 |
| | | | | 318/400.33 |
| 2016/0329849 A1* | 11/2016 | Nakajima | .............. | G01R 23/00 |

OTHER PUBLICATIONS

Bolognani, S. et al., "Automatic tracking of MTPA trajectory in IPM motor drives based on AC current injection," Energy Conversion Congress and Exposition, Sep. 20, 2009, pp. 2340-2346.

Sungim, K. et al., "Parameter independent maximum torque per ampere (MTPA) control of IPM machine based on signal injection," Applied Power Electronics Conference and Exposition (APEC), Feb. 21, 2010, pp. 103-108.

\* cited by examiner

METHOD, ANGLE DETERMINATION APPARATUS AND CONTROL APPARATUS

BACKGROUND OF THE INVENTION

The present invention relates to a method and to an angle-determination apparatus for determining a rotor angle of a rotor of an electric machine. The invention further relates to an appropriate control apparatus.

In modern vehicles, internal-combustion engines are frequently being supplemented or replaced by electric motors. By way of electric drive machine in such electric and hybrid vehicles, a permanent-magnet synchronous machine (PMSM) is frequently employed nowadays, on account of its high efficiency and its small structural form or high power density.

The closed-loop control of the PMSM is ordinarily undertaken by a so-called field-oriented closed-loop control system. In this case, it is necessary to know the current absolute rotor angle of the PMSM at each moment with sufficient accuracy. The capture of this rotor angle is normally undertaken with a position encoder (such as, for example, a resolver, an incremental encoder, etc.). Alternatively, the rotor angle can be captured in encoder-free manner, in which case different methods may come into operation within various speed-ranges. In the medium and high speed-ranges, the so-called back EMF can be utilized. In this case, the fundamental-oscillation quantities of the stator voltages and stator currents are drawn upon as input variables for the method, and the rotor position is calculated therefrom without influencing the drive signals. For instance, U.S. Pat. No. 4,893,067 A presents a method in which the back EMF is utilized in order to determine the motor position.

At a standstill and in the low speed-range, the methods based on back EMF cannot be utilized, on account of the low voltage quantities. Rather, a method is needed that is able to ascertain the rotor angle independently of the speed.

SUMMARY OF THE INVENTION

The present invention discloses a method, an angle-determination apparatus, and a control apparatus.

Accordingly, there is provided:

A method for determining a rotor angle of a rotor of an electric machine, having the following steps: generating a torque-dependent test signal that depends on the torque of the electric machine and has a higher frequency than a supply signal for the electric machine, driving the electric machine with a supply signal and with the test signal which is superimposed on the supply signal, capturing phase currents of the electric machine, and determining the rotor angle of the rotor of the electric machine on the basis of the effects of the test signal on the phase currents.

Furthermore there is provided:

An angle-determination apparatus for determining an angle of a rotor of an electric machine with a method according to the invention, with a signal-generator which generates a torque-dependent test signal that depends on the torque of the electric machine and has a higher frequency than a supply signal for the electric machine, and which superimposes said test signal on a supply signal of the electric machine, and with a controller that is designed to determine the rotor angle of the rotor of the electric machine on the basis of the effects of the test signal on the phase currents of the electric machine.

Lastly, there is provided:

A control apparatus for an electric machine, with an angle-determination apparatus according to the invention and with a control device that is designed to drive the electric machine in vector-based manner on the basis of a predetermined set torque.

Conventional methods, which ascertain information about the rotor position with the aid of sinusoidal or rectangular voltage test signals or current test signals, feed test signals in the estimated d-direction in alternating manner.

The perception underlying the present invention consists in the fact that in such conventional methods the high-frequency current response and the high-frequency test current lead to a large torque ripple and to an acoustic disturbance. Furthermore, the large DC current ripple arising therefrom burdens the film capacitors in the drive system.

In order to avoid such disturbances, the method according to the invention provides an alternating high-frequency (HF) torque-dependent test signal which, for example, may take sinusoidal or rectangular form. But, in contrast to the aforementioned methods, the test signal is not fed in or controlled in the estimated d-axis. Rather, the direction of the test signal is chosen in a manner depending on the current torque of the electric machine in such a way that the resultant high-frequency oscillation of the motor-current phasor only minimally influences the torque of the electric machine.

Consequently both the torque ripple caused by the test signal and the current ripple in the intermediate circuit can be reduced to a minimum. In addition, in comparison with the known methods the described method displays a distinctly lower acoustic disturbance on the test bench.

Advantageous embodiments and further developments result from the dependent claims and also from the description with reference to the figures.

In one embodiment, the torque-dependent test signal can be generated as a test-voltage vector in a voltage-vector coordinate system, also kl coordinate system, with a first axis which corresponds to the direction of injection of the test signal, also k-axis, and with a second axis which is perpendicular to the first axis, also l-axis. Furthermore, the voltage vector can have only one component in the first axis—that is to say, the k-axis—and can be generated in such a manner that the oscillation of the motor-current phasor in the coordinate system fixed with respect to the rotor, also dq coordinate system, is approximately tangential to a torque contour line corresponding to the torque demanded by the electric machine. The torque contour line in this case characterizes in the rotor-fixed coordinate system all the combinations of d-axis and q-axis currents that set a predetermined torque in the electric machine.

The test-voltage vector can, for example, be represented as follows:

$$\begin{pmatrix} U_{sk,HF} \\ U_{sl,HF} \end{pmatrix} = V \begin{pmatrix} \sin(\omega t) \\ 0 \end{pmatrix}$$

When the test-voltage vector is being generated, a voltage test signal having a rotational angular velocity of a predetermined frequency, which typically lies within the range between 500 Hz and 5 kHz, can accordingly be generated.

Furthermore, a transformation angle can be determined in the rotor-fixed coordinate system on the basis of the control currents for the electric machine. The control currents in the dq coordinate system correspond to a predetermined torque.

The transformation angle is accordingly determined on the basis of the predetermined torque. For instance, a lookup table may have been provided for this purpose.

With the aid of the torque-dependent transformation angle, the voltage test signal can be transformed into the rotor-fixed coordinate system—that is to say, the dq coordinate system. The transformed voltage test signal can then be superimposed on the control-voltage signal for the electric machine, in order to drive said machine.

In one embodiment, phase currents of the electric machine can be measured and can be transformed into a motor-current vector in the rotor-fixed coordinate system on the basis of the determined rotor angle when the rotor angle is being determined, it being possible for the motor-current vector to be transformed into the voltage-vector coordinate system on the basis of the transformation angle. On the basis of the test signal in the voltage-vector coordinate system— that is to say, the test-voltage vector—the transformed motor-current vector can be demodulated. Accordingly, the rotor angle that is determined in a later step is utilized. It is consequently a question of a closed control loop. A starting value for the rotor angle can, for example, be predetermined for the first iteration.

The direction of the current response to the test signal in the kl coordinate system depends both on the rotor position and on the direction of injection of the test signal. The locus curve of the demodulated current response in the kl coordinate system is a circle, the center of which lies on the k-axis (see FIG. 5). The demodulation in this case can be undertaken, for example, by means of a cosine function and subsequent lowpass filtering:

$$Lowpass\{i\_sk\_hf * \cos(\omega t)\} = \\ -\frac{1}{\omega(L\_sd + L\_sq)}V + \frac{1}{\omega(L\_sd - L\_sq)}V * \cos(2\theta\_r - 2\theta\_k)$$

$$Lowpass\{i\_sl\_HF * \cos(\omega t)\} = \frac{1}{\omega(L\_sd - L\_sq)}V * \sin(2\theta\_r - 2\theta\_k)$$

In these equations, L_xx denotes respectively the inductance of the electric machine in the respective axis, ω denotes the angular velocity, Θ_r denotes the angle of the rotor, and Θ_k denotes the angle of the k-axis with respect to the α-axis in the coordinate system fixed with respect to the stator.

In one embodiment, the demodulated motor-current vector can be transformed into a control coordinate system on the basis of a correction angle for compensating for the characteristic of the electric machine. Furthermore, the rotor angle can be determined in a so-called "tracking observer" controller in such a manner that the magnitude of the component of the motor-current vector transformed into the control coordinate system that corresponds to the second axis of the voltage-vector coordinate system, Lowpass{i_sl_HF*cos(ωt)}, becomes minimal—that is to say, zero.

If the test signal is always fed in the direction of the estimated rotor angle θ_k=θ_r, the demodulated current quantity on the 1-axis results as follows:

$$Lowpass\{i\_sl\_HF * \cos(\omega t)\} = \frac{1}{\omega(L\_sd - L\_sq)}V * \sin(2\theta\_r - 2\hat{\theta}\_r)$$

If this quantity is controlled to zero, in the steady state $\hat{\theta}\_r = \theta\_r$ is equal to the transformation angle. That is to say, the injection direction always follows the rotor angle.

In the method described here, the test signal is impressed, as already mentioned, in the direction of a transformation angle instead of in the estimated d-direction. The corresponding phasor diagram is shown in FIG. 4 and FIG. 6. The demodulated current quantities in the kl coordinate system are corrected with the aid of angle θ_k and serve again as input of the "tracking observer" which determines and outputs the corresponding rotor angle.

The correction angle θ_k is, like the transformation angle, also an injection angle, dependent on the working-point.

Instead of utilizing a test-voltage vector as the basis for the method according to the invention, a test-current vector may also be utilized.

Ordinarily in connection with the drive of an electric machine within the scope of an MTPC method (maximum torque per current), a current vector, also called a fundamental current phasor, is already determined in the dq coordinate system, said current vector being perpendicular to the corresponding torque contour line. Consequently said vector is perpendicular to the tangential direction in which the current brought about by the test signal is to act on the electric machine.

In one embodiment, therefore, a test-current vector having a rotational angular velocity of a predetermined frequency can be generated in the rotor-fixed coordinate system—that is to say, the dq coordinate system.

Furthermore, the phase currents of the electric machine can be captured and can be transformed into the rotor-fixed coordinate system on the basis of the determined rotor angle, the torque-dependent test signal being formed as the sum of a first voltage vector, generated on the basis of the test-current vector, and a second voltage vector, controlled on the basis of the test-current vector minus the transformed phase currents. The generation of this second voltage vector is undertaken, for example, with the aid of a proportional resonant controller (PR controller).

The direction of the test signal corresponds to the direction with which the test signal is fed in when it is generated on the basis of a test-voltage vector. Since the second voltage vector is generated on the basis of a closed-loop control, the current in the phase windings of the motor can always be precisely controlled.

In one embodiment, the second voltage vector can be demodulated on the basis of the test-current vector, it being possible for the demodulated second voltage vector to be transformed into a control coordinate system on the basis of a correction angle for compensating for the characteristic of the electric machine, and for the rotor angle to be determined in such a manner that the magnitude of the transformed voltage vector in a predetermined torque-dependent direction in the rotor-fixed coordinate system becomes minimal—that is to say, zero. This rotor angle then represents the determined rotor angle of the rotor of the electric machine.

The above configurations and further developments can be combined with one another arbitrarily, to the extent that this is meaningful. Further possible configurations, further developments and implementations of the invention also encompass combinations, not mentioned explicitly, of features of the invention described previously or in the following with respect to the exemplary embodiments. In particular in this connection, a person skilled in the art will also add individual aspects by way of improvements or supplements to the respective basic form of the present invention.

BRIEF DESCRIPTION OF THE DRAWINGS

The present invention will be elucidated in more detail below with reference to the exemplary embodiments specified in the schematic figures of the drawings. Shown are.

In all the figures, identical or functionally identical elements and apparatuses have been provided with the same reference symbols, unless otherwise stated.

DETAILED DESCRIPTION

Figure 1:
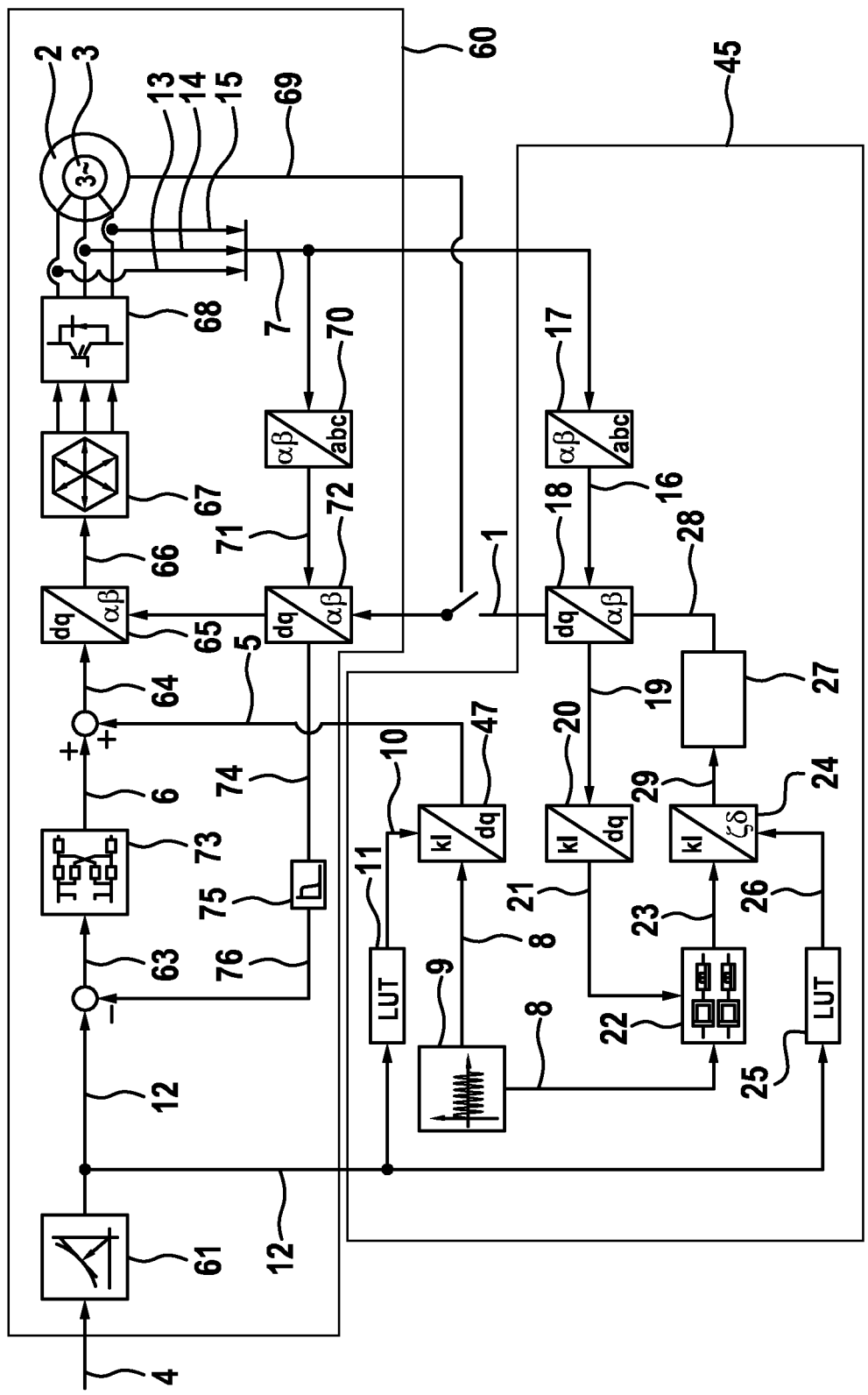
FIG. 1 a block diagram of an embodiment of an angle-determination apparatus according to the invention, FIG. 2 a block diagram of a further embodiment of an angle-determination apparatus according to the invention, FIG. 3 a flow chart of an embodiment of a method according to the invention, FIG. 4 a dq diagram for illustrating the currents and voltages according to an embodiment of the present invention.

FIG. 1 shows a block diagram of an embodiment of an angle-determination apparatus 45 according to the invention, which is coupled with a control device 60.

Figure 5:
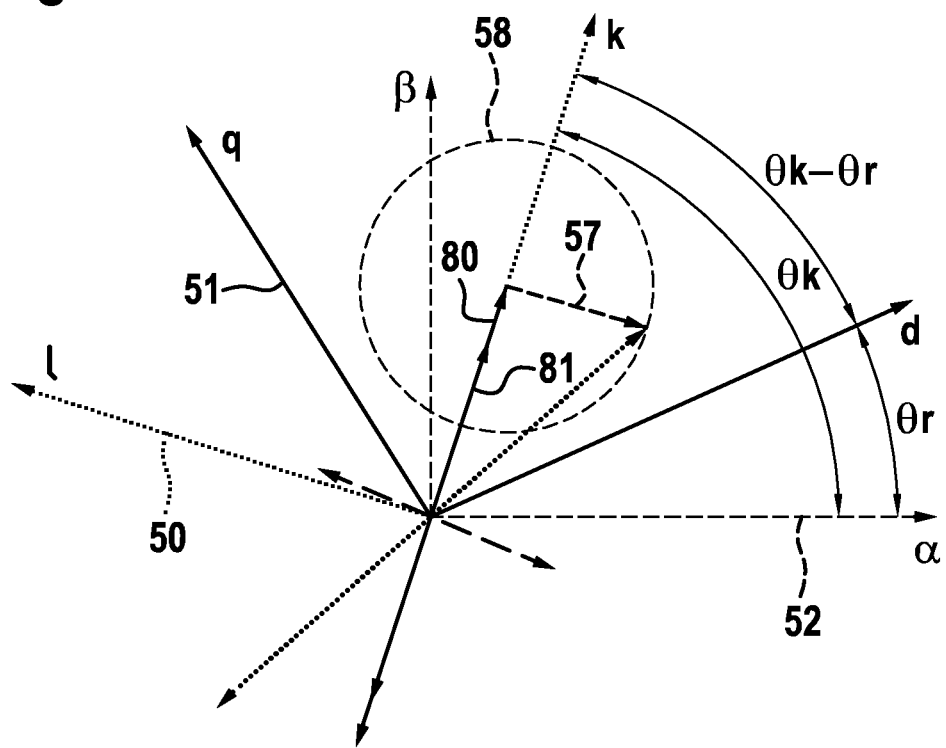
FIG. 5 a diagram for illustrating the different coordinate systems according to the present invention, FIG. 6 a kl diagram for illustrating the currents and voltages according to an embodiment of the present invention.

The angle-determination apparatus 45 exhibits a voltage-function generator 9 which generates a test-voltage vector 8 in a voltage-vector coordinate system 50—that is to say, the kl coordinate system 50 (see FIG. 5). The test-voltage vector 8 is generated in such a manner that it has only one component in the k-axis. For instance, the test-voltage vector 8 may have been defined as follows:

$$\begin{pmatrix} Usk, HF \\ Usl, HF \end{pmatrix} = V \begin{pmatrix} \sin(\omega t) \\ 0 \end{pmatrix}$$

Furthermore, a transformation module 47 can transform the test-voltage vector 8 into the rotor-fixed coordinate system 51 on the basis of a transformation angle 10 (see FIG. 5), and can output it as test signal 5.

The transformation angle 10 is read out from a lookup table 11 which determines the angle on the basis of the set currents 12 in the rotor-fixed coordinate system 51 in such a manner that the current vector 54 arising in the rotor-fixed coordinate system 51 is tangential to a torque contour line 53 (see FIG. 4) corresponding to the torque 4 demanded by the electric machine 3.

The angle-determination apparatus 45 further exhibits a first transformation module 17 which transforms captured phase currents 13, 14, 15 of the electric machine 3—or, to be more exact, a corresponding vector 7—into a motor-current vector 16 in a stator-fixed coordinate system 52. A second transformation module 18 transforms this motor-current vector 16 from the stator-fixed coordinate system 52 into the rotor-fixed coordinate system 51 on the basis of the determined rotor angle 1. Since the rotor angle 1 is utilized here, and the output of the second transformation module 18 is utilized for the calculation thereof, it is a question of a closed control loop.

The motor-current vector 19 is transformed from the rotor-fixed coordinate system 51 into the voltage-vector coordinate system 50 with the aid of the transformation angle 10, already utilized above, with a fourth transformation module 20. A demodulator 22 demodulates the motor-current vector 21 in the voltage-vector coordinate system 50 on the basis of the test-voltage vector 8. The demodulation can be undertaken, for example, by means of a cosine function and subsequent lowpass filtering:

$$Lowpass\{i\_sk\_HF * \cos(\omega t)\} = $$

$$-\frac{1}{\omega(L\_sd + L\_sq)}V + \frac{1}{\omega(L\_sd - L\_sq)}V * \cos(2\theta\_r - 2\theta\_k)$$

$$Lowpass\{i\_sl\_HF * \cos(\omega t)\} = \frac{1}{\omega(L\_sd - L\_sq)}V * \sin(2\theta\_r - 2\theta\_k)$$

A fifth transformation module 24 transforms the demodulated motor-current vector 23 into a control coordinate system on the basis of a correction angle 26 for compensating for the characteristic of the electric machine 3. The correction angle 26 is likewise determined by a lookup table 25 on the basis of the set currents 12.

The aforementioned closed control loop closes over the controller module 27 which determines the rotor angle 1 in such a manner that the magnitude of the component of the motor-current vector 29 transformed into the control coordinate system that corresponds to the second axis 1 of the voltage-vector coordinate system (50) becomes minimal—that is to say, zero.

This component can also be represented as:

$$Lowpass\{i\_sl\_HF * \cos(\omega t)\} = \frac{1}{\omega(L\_sd - L\_sq)}V * \sin(2\theta\_r - 2\hat{\theta}\_r)$$

The control device 60 receives a set torque 4 for the electric machine 2. With the aid of the MPTC block 61, the corresponding stator currents 12 or set currents 12 are calculated in the rotor-fixed coordinates 51 from the desired set torque 4.

At the same time, the actual phase currents 13, 14, 15 are captured and are transformed via transformation modules 70, 72 firstly into the stator-fixed coordinate system 52 and then into the rotor-fixed coordinate system 51. With the aid of these transformed phase currents 76, the fault currents 63 are ascertained and made available as input variable to a current controller 73.

The manipulated variables 6 generated by the current controller 73 in the dq coordinate system consist of fundamental low-frequency output variables. To these there is added the test signal 5 which has a higher frequency which typically lies between 500 Hz and 5 kHz. The resultant sum forms the voltage signals 64.

After the calculation of the voltage signals 64, the latter are converted by transformation module 65 and the PWM controller 67 into control signals for an inverter 68 which feeds in corresponding signals at the terminals of the electric machine 2.

Figure 2:
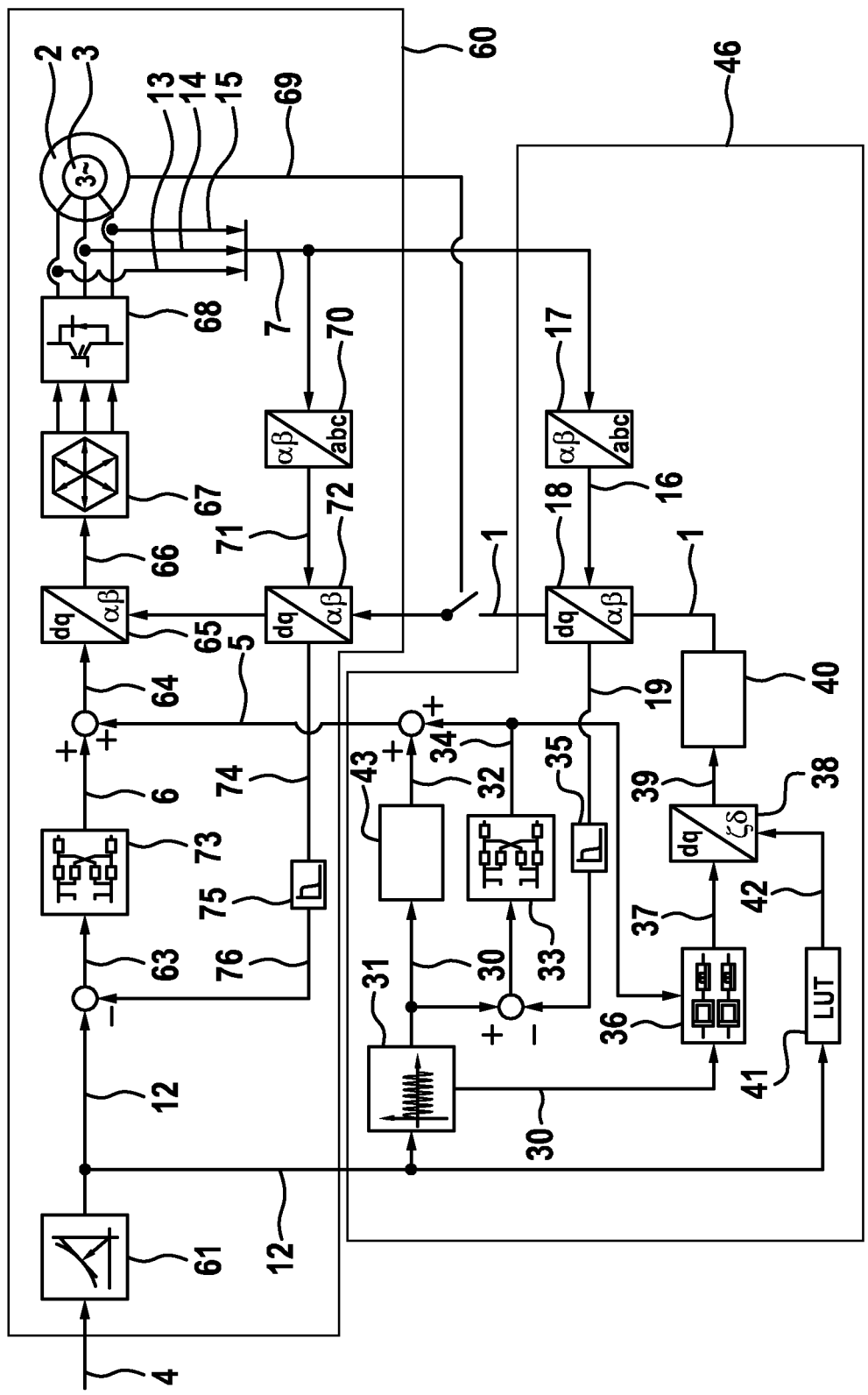

FIG. 2 shows a block diagram of a further embodiment of an angle-determination apparatus 46 according to the invention, which is likewise coupled with the control device 60.

In contrast to FIG. 1, the angle-determination apparatus 46 exhibits a current-function generator 31 which generates a test-current vector 30 having a rotational angular velocity of a predetermined frequency in the rotor-fixed coordinate system 51. Accordingly, no test-voltage vector 8 is generated.

The angle-determination apparatus 46 likewise exhibits the first transformation module 17 which transforms the captured phase currents 13, 14, 15 of the electric machine 3—or, to be more exact, a corresponding vector 7—into a motor-current vector 16 in the stator-fixed coordinate system 52. Furthermore, the second transformation module 18 is likewise provided, which transforms this motor-current vector 16 from the stator-fixed coordinate system 52 into the rotor-fixed coordinate system 51 on the basis of the determined rotor angle 1.

In connection with the drive of an electric machine within the scope of an MTPC (maximum torque per ampere controller), a current vector 12, also called a fundamental current phasor, is already determined in the dq coordinate system, said current vector being perpendicular to the corresponding torque contour line 53. Hence on the basis of this fundamental current phasor 12 it is very easily possible to generate a corresponding test-current vector 30 which is tangential to the torque contour line 53 and hence also to the fundamental current phasor 12.

A feed-forward converter 43 calculates a first voltage vector 32 from the test-current vector 30 with the aid of the torque-dependent machine parameters. Furthermore, a current controller 33 generates a second voltage vector 34 in the rotor-fixed coordinate system 51 on the basis of the test-current vector 30 and the highpass-filtered motor-current vector 19. The sum of the first voltage vector 32 and second voltage vector 34 is output as the test signal 5.

The angle-determination apparatus 46 further exhibits a demodulator 36 which demodulates the second voltage vector 34 on the basis of the test-current vector 30. This can be done in a manner analogous to that described above.

A fourth transformation module 38 transforms the second voltage vector 37 into a control coordinate system. For this purpose, a correction angle 42 from a lookup table 41 is likewise utilized, which compensates for the characteristic of the electric machine 3.

Subsequently the controller module 40 determines the rotor angle 1 in such a manner that the magnitude of the transformed second voltage vector 39 becomes minimal at least in one axis of the rotor-fixed coordinate system 51.

Figure 3:
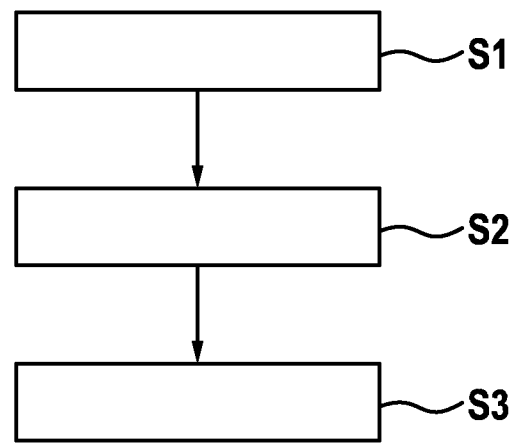

FIG. 3 shows a flow chart of an embodiment of a method according to the invention for determining a rotor angle 1 of a rotor 2 of an electric machine 3.

In a first step S1, a torque-dependent test signal 5 is generated that depends on the torque 4 of the electric machine 3 and has a higher frequency than a supply signal 6 for the electric machine 3. The electric machine 3 is then driven with the supply signal 6 and with the test signal 5 which is superimposed on the supply signal 6. Lastly, phase currents 13, 14, 15 of the electric machine 3 are captured, and the rotor angle 1 of the rotor 2 of the electric machine 3 is determined on the basis of the effects of the test signal 5 on the phase currents 13, 14, 15.

The torque-dependent test signal 5 can be generated as a test-voltage vector 5 in a voltage-vector coordinate system 50 which has a first axis k, which corresponds to the direction of injection of the test signal 5, and a second axis 1, which is perpendicular to the first axis k.

The test-voltage vector 5 in this figure can have only one component in the first axis k and can be generated in such a manner that the oscillations of the phase currents 13, 14, 15—that is to say, of the motor-current phasor—in a rotor-fixed coordinate system 51 are approximately tangential to a torque contour line 53 corresponding to the torque 4 demanded by the electric machine 3.

For the purpose of generating the test-voltage vector 5, a voltage test signal 8 having a rotational angular velocity of a predetermined frequency can be generated. A transformation angle 10 can be determined in the rotor-fixed coordinate system 51 on the basis of control currents 12 of the electric machine 3, and the voltage test signal 8 can be transformed into the rotor-fixed coordinate system 51 on the basis of the determined transformation angle 10.

Furthermore, when the rotor angle 1 is being determined the phase currents 13, 14, 15 of the electric machine 3 can be measured and can be transformed into a motor-current vector 19 in the rotor-fixed coordinate system 51 on the basis of the determined rotor angle 1. In this case, the motor-current vector 19 can be transformed into the voltage-vector coordinate system 50 on the basis of the transformation angle 10. Furthermore, the transformed motor-current vector 21 can be demodulated in the voltage-vector coordinate system 50 on the basis of the test signal 8.

Lastly, the demodulated motor-current vector 23 can be transformed into a control coordinate system on the basis of a correction angle 26 for compensating for the characteristic of the electric machine 3, and the rotor angle 1 can be determined in such a manner that the magnitude of the component of the motor-current vector 23 transformed into the control coordinate system that corresponds to the second axis 1 of the voltage-vector coordinate system 50 becomes minimal—that is to say, zero.

A further possibility is to generate, instead of a test-voltage vector 8, a test-current vector 30 having a rotational angular velocity of a predetermined frequency in the rotor-fixed coordinate system 51.

Furthermore, the phase currents 13, 14, 15 of the electric machine 3 are captured and are transformed into the rotor-fixed coordinate system 51 on the basis of the determined rotor angle 1. In addition, the torque-dependent test signal 5 can be formed as a sum of a first voltage vector 32, generated on the basis of the test-current vector 30, and a second voltage vector 34, controlled on the basis of the test-current vector 30 minus the transformed phase currents 13, 14, 15.

The second voltage vector 34 is then demodulated on the basis of the test-current vector 30, whereby the demodulated second voltage vector 37 is transformed into a control coordinate system on the basis of a correction angle 42 for compensating for the characteristic of the electric machine 3.

The rotor angle 1 can then be determined in such a manner that the magnitude of the transformed voltage vector 39 becomes minimal at least in one axis of the rotor-fixed coordinate system 51.

Figure 4:
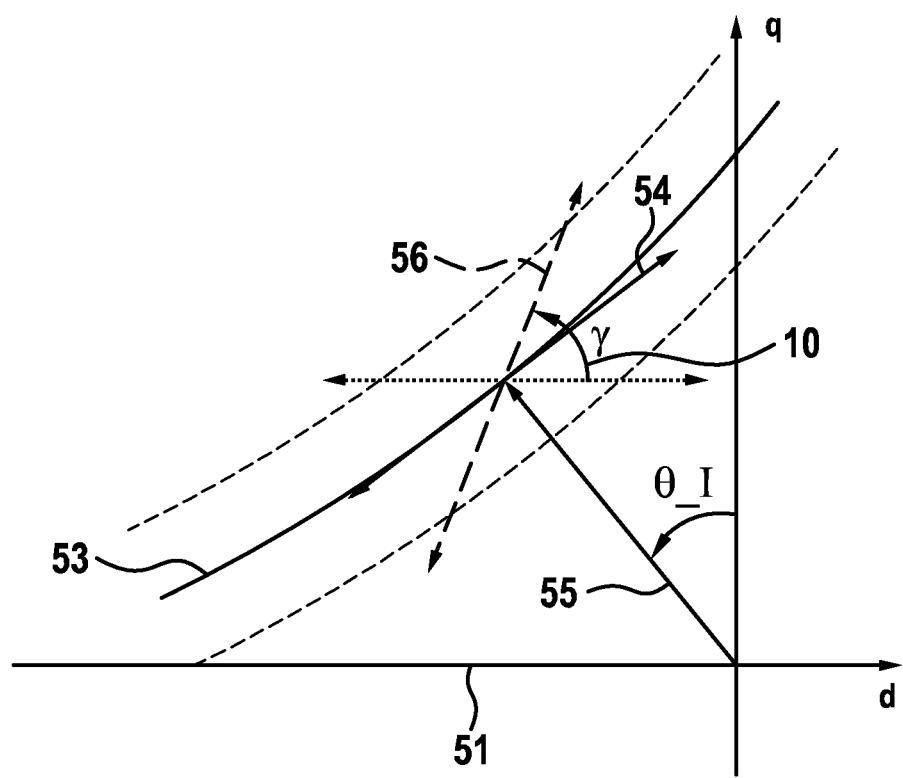

FIG. 4 shows a dq diagram which represents the rotor-fixed coordinate system 51 of the electric machine 2. In the dq diagram 51 a contour line 53 has been drawn which represents the torque line for a given set torque. The d-axis and q-axis currents, the vectors of which lie on the contour line 53, accordingly all generate the same torque. Furthermore, a vector 55 is represented which extends from the origin of the dq diagram to the contour line 53, said vector 55 being perpendicular to the contour line 53. At the end of vector 55, the current vector 54 is represented tangential to the contour line 53.

This current vector 54 is the current vector that is to result when the test signal 5 is superimposed on the control signal 6 for the electric machine 2. It can be discerned that such a current vector changes the torque substantially less than the current vector, represented by a dotted line, that is parallel to the d-axis and is utilized in conventional methods. Represented furthermore by a dashed line is the voltage vector 56 which has to be fed into the electric machine 2 in order to generate the current vector 54. In this case, the voltage vector 56 has been shifted by the transformation angle 10=γ with respect to the current vector represented by a dotted line.

FIG. 5 shows a diagram for illustrating the different coordinate systems according to the present invention.

The stator-fixed coordinate system 52 is represented by dashed lines with a horizontal axis α and a vertical axis β. The axes d and q of the dq coordinate system 51 are represented by solid lines. In this case, the dq coordinate system 51 has been rotated by an angle Θr with respect to the stator-fixed coordinate system 52—that is to say, this angle corresponds to the rotor angle 1. It will be understood that angle Θr changes with the rotation of the rotor 2 of the electric machine 2. The diagram shown in FIG. 5 is accordingly merely a snapshot. Furthermore, represented with dotted axes k and l is the voltage-vector coordinate system 50 which has been rotated by angle Θk with respect to the stator-fixed coordinate system 52.

The k-axis corresponds in this case to the direction of injection of the test signal 5, represented as current vector 80 or voltage vector 81. The locus curve of the demodulated current response 57 in the kl coordinates is a circle 58, the center of which lies on the k-axis. The demodulation can, as already described above, be undertaken by means of a cosine function and subsequent lowpass filtering.

Figure 6:
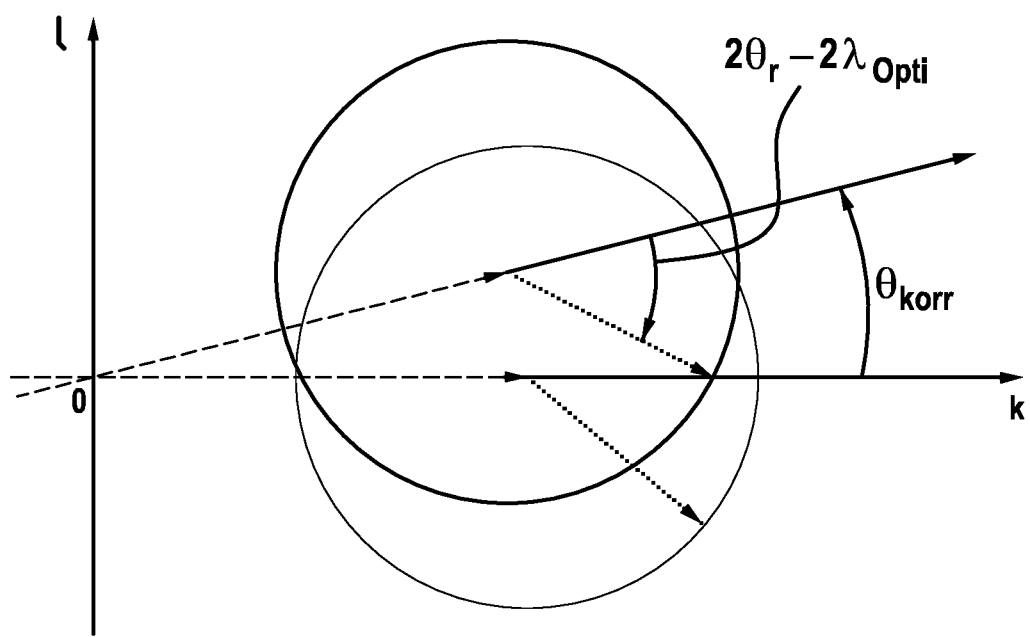

FIG. 6 shows a kl diagram for illustrating the currents and voltages according to an embodiment of the present invention.

As already mentioned above, the magnitude of the component of the motor-current vector 29 that corresponds to the second axis i of the voltage-vector coordinate system 50 is controlled with the aid of a so-called "tracking observer" controller 27, 40 in such a manner that said magnitude becomes minimal—that is to say, zero:

$$Lowpass\{i\_sl\_HF * \cos(\omega t)\} = 0 = \frac{1}{\omega(L\_sd - L\_sq)} V * \sin(2\theta\_r - 2\hat{\theta}\_r)$$

In the steady state, this results in $\theta_r = \hat{\theta}\_r$. That is to say, the injection direction always follows the rotor angle.

The phasor diagram shown in FIG. 6 accordingly results when the test signal is impressed in the direction of the transformation angle 10 instead of in the estimated d-direction. The demodulated current quantities in the kl system are then corrected with the aid of the correction angle 26, 42=Θkorr and serve again as input of the "tracking observer" controller 27, 40. The correction angle 26, 42 is, like the optimal injection angle or transformation angle 10, dependent on the working-point and can be determined in advance, for example experimentally or computationally.

Although the present invention has been described above with reference to preferred exemplary embodiments, it is not restricted thereto but may be modified in diverse ways. In particular, the invention can be varied or modified in many different ways without deviating from the essence of the invention.

The invention claimed is:

1. A method for determining a rotor angle (1) of a rotor (2) of an electric machine (3), having the following steps:

generating (S1) a torque-dependent test signal (5) that depends on the torque (4) of the electric machine (3) and has a higher frequency than a supply signal (6) for the electric machine (3), driving the electric machine (3) with the supply signal (6) and with the test signal (5) which is superimposed on the supply signal (6), capturing phase currents (13, 14, 15) of the electric machine (3), and determining the rotor angle (1) of the rotor (2) of the electric machine (3) on the basis of the effects of the test signal (5) on the phase currents (13, 14, 15);

wherein a direction of the test signal (5) is selected in accordance with the current torque (4) of the electric machine (3) such that a resulting high-frequency oscillation of the motor current indicator only minimally affects the torque (4) of the electric machine (3).

2. The method as claimed in claim 1, wherein the torque-dependent test signal (5) is generated as a test-voltage vector (5) in a voltage-vector coordinate system (50) with a first axis (k), which corresponds to the direction of injection of the test signal (5), and a second axis (l), which is perpendicular to the first axis (k), wherein the test-voltage vector (5) has only one component in the first axis (k) and is generated in such a manner that the oscillation of the phase currents (13, 14, 15) in a rotor-fixed coordinate system (51) is approximately tangential to a torque contour line (53) corresponding to the torque (4) demanded by the electric machine (3).

3. The method as claimed in claim 2, wherein for the purpose of generating the test-voltage vector (5) a voltage test signal (8) is generated having a rotational angular velocity of a predetermined frequency, and wherein a transformation angle (10) is determined on the basis of control currents (12) of the electric machine (3) in the rotor-fixed coordinate system (51), and the voltage test signal (8) is transformed into the rotor-fixed coordinate system (51) on the basis of the determined transformation angle (10).

4. The method as claimed in claim 3, wherein when the rotor angle (1) is being determined phase currents (13, 14, 15) of the electric machine (3) are measured and are transformed into a motor-current vector (19) in the rotor-fixed coordinate system (51) on the basis of the determined rotor angle (1), wherein the motor-current vector (19) is transformed into the voltage-vector coordinate system (50) on the basis of the transformation angle (10), and wherein the transformed motor-current vector (21) is demodulated in the voltage-vector coordinate system (50) on the basis of the test signal (8).

5. The method as claimed in claim 4, wherein the demodulated motor-current vector (23) is transformed into a control coordinate system on the basis of a correction angle (26) for compensating for the characteristic of the electric machine (3), and wherein the rotor angle (1) is determined in such a manner that the magnitude of the component of the motor-current vector (23) transformed into the control coordinate system that corresponds to the second axis (l) of the voltage-vector coordinate system (50) becomes minimal.

6. The method as claimed in claim 1, wherein a test-current vector (30) is generated having a rotational angular velocity of a predetermined frequency in the rotor-fixed coordinate system (51), and wherein the phase currents (13, 14, 15) of the electric machine (3) are captured and are transformed into the rotor-fixed coordinate system (51) on the basis of the determined rotor angle (1), and wherein the torque-dependent test signal (5) is formed as the sum of a first voltage vector (32), generated on the basis of the test-current vector (30), and a second voltage vector (34), controlled on the basis of the test-current vector (30) minus the transformed phase currents (13, 14, 15).

7. The method as claimed in claim 6, wherein the second voltage vector (34) is demodulated on the basis of the test-current vector (30), and wherein the demodulated second voltage vector (37) is transformed into a control coordinate system on the basis of a correction angle (42) for compensating for the characteristic of the electric machine (3), and wherein the rotor angle (1) is determined in such a manner that the magnitude of the transformed voltage vector (39) in a predetermined torque-dependent direction in the rotor-fixed coordinate system (51) becomes minimal.

8. An angle-determination apparatus (45, 46) for determining an angle (1) of a rotor (2) of an electric machine (3) with a method as claimed in claim 1, the angle-determination apparatus comprising:

a signal-generator (9, 47; 31) which generates a torque-dependent test signal (5) that depends on the torque (4) of the electric machine (3) and has a higher frequency than a supply signal (6) for the electric machine (3), and superimposes said test signal on a supply signal (6) of the electric machine (3), and a controller (27; 40) configured to determine the rotor angle (1) of the rotor (2) of the electric machine (3) on the basis of the effects of the test signal (5) on the phase currents (13, 14, 15) of the electric machine (3).

9. The angle-determination apparatus (45, 46) as claimed in claim 8, further comprising:

a first transformation module (17) configured to transform captured phase currents (13, 14, 15) of the electric machine (3) into a motor-current vector (16) in a stator-fixed coordinate system (52), a second transformation module (18) configured to transform the motor-current vector (16) from the stator-fixed coordinate system (52) into the rotor-fixed coordinate system (51) on the basis of the determined rotor angle (1).

10. The angle-determination apparatus (45, 46) as claimed in claim 9, further comprising:

a voltage-function generator (9) configured to generate a test-voltage vector (8) in a voltage-vector coordinate system (50) having a first axis (k), which corresponds to the direction of injection of the test signal (5), and a second axis (l), which is perpendicular to the first axis (k), in such a manner that said vector has only one component in the first axis (k), a third transformation module (47) which transforms the test-voltage vector (8) into the rotor-fixed coordinate system (51) on the basis of a transformation angle (10) determined on the basis of the set currents (12) in the rotor-fixed coordinate system (51), and outputs it as a test signal (5).

11. The angle-determination apparatus (45, 46) as claimed in claim 10, further comprising:

a fourth transformation module (20) configured to transform the motor-current vector (19) from the rotor-fixed coordinate system (51) into the voltage-vector coordinate system (50) on the basis of the transformation angle (10), a demodulator (22) configured to demodulate the motor-current vector (21) in the voltage-vector coordinate system (50) on the basis of the test-voltage vector (8), a fifth transformation module (24) configured to transform the demodulated motor-current vector (23) into a control coordinate system on the basis of a correction angle (26) for compensating for the characteristic of the electric machine (3), and a controller module (27) configured to determine the rotor angle (1) in such a manner that the magnitude of the component of the motor-current vector (29) transformed into the control coordinate system that corresponds to the second axis (l) of the voltage-vector coordinate system becomes minimal.

12. The angle-determination apparatus (45, 46) as claimed in claim 9, further comprising:

a current-function generator (31) configured to generate a test-current vector (30) having a rotational angular velocity of a predetermined frequency in the rotor-fixed coordinate system (51), a converter (31) configured to transform the test-current vector (30) into a first voltage vector (32), a current controller (33) configured to generate a second voltage vector (34) in the rotor-fixed coordinate system (51) on the basis of the test-current vector (30) and the highpass-filtered motor-current vector (19), the sum of the first voltage vector (32) and second voltage vector (34) forming the test signal (5), and a demodulator (36) configured to generate the second voltage vector (34) on the basis of the test-current vector (30).

13. The angle-determination apparatus (45, 46) as claimed in claim 12, further comprising:

a fourth transformation module (38) configured to transform the demodulated second voltage vector (37) into a control coordinate system on the basis of a correction angle (42) for compensating for the characteristic of the electric machine (3), and a controller module (40) configured to determine the rotor angle (1) in such a manner that the magnitude of the transformed second voltage vector (39) in a predetermined torque-dependent direction of the rotor-fixed coordinate system (51) becomes minimal.

14. A control apparatus for an electric machine (3), the control apparatus comprising:

an angle-determination apparatus (45, 46) as claimed in claim 8, a control device (60) configured to drive the electric machine (3) in vector-based manner on the basis of a predetermined set torque (4).

15. The method as claimed in claim 3, wherein the predetermined frequency of the voltage test signal (8) is between 100 Hz and 10 kHz.

16. The method as claimed in claim 6, wherein the predetermined frequency of the test-current vector (30) is between 100 Hz and 10 kHz.

* * * * *